Nov. 1, 1966 A. V. KISOVEC 3,282,350
ROTOR BLADE MOUNTING CONSTRUCTION
Filed Oct. 20, 1965 2 Sheets-Sheet 1
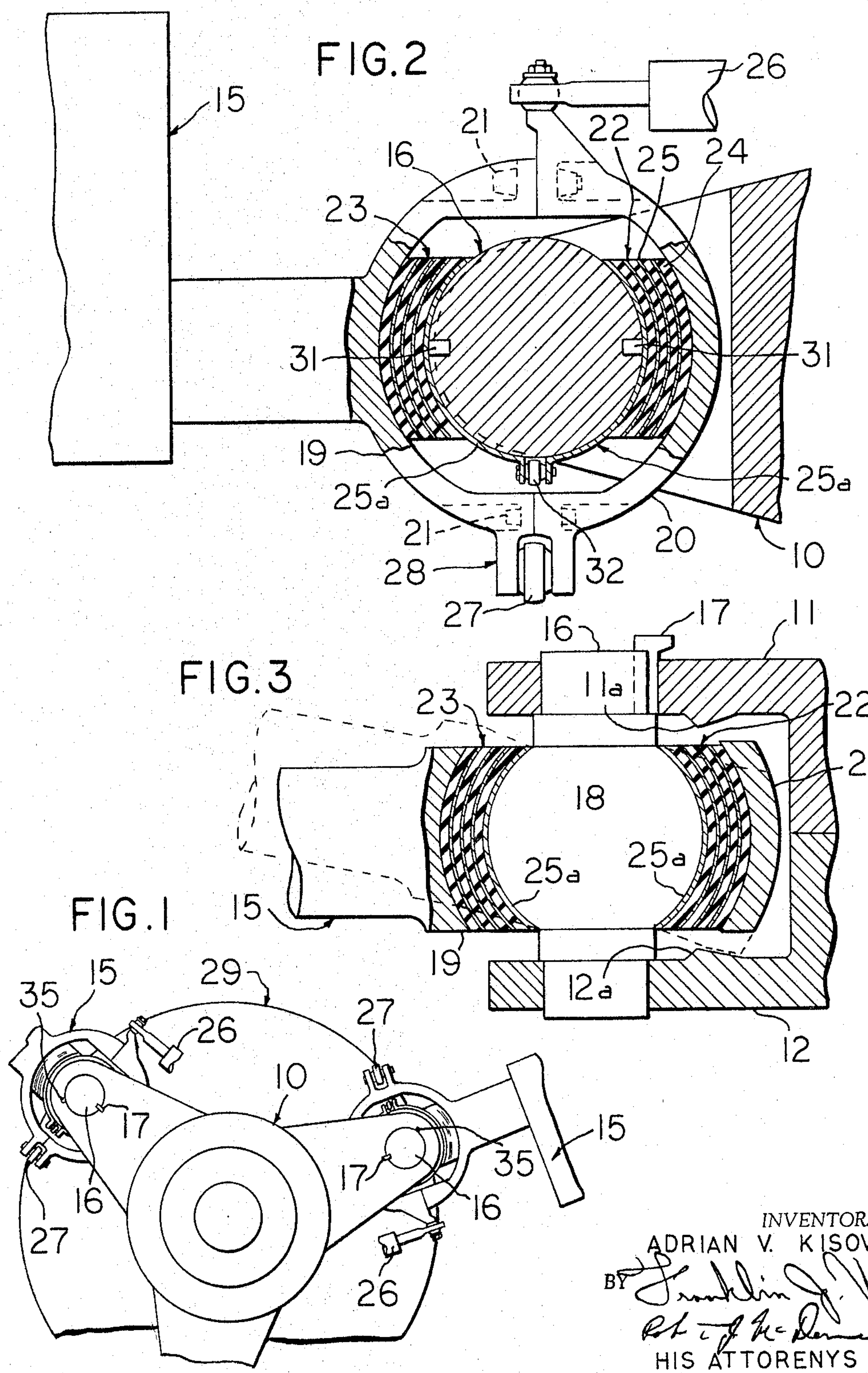
INVENTOR.
ADRIAN V. KISOVEC
BY Franklin J. Visek
Robert J. McDermott
HIS ATTORENYS ROTOR BLADE MOUNTING CONSTRUCTION
Filed Oct. 20, 1965 2 Sheets-Sheet 2
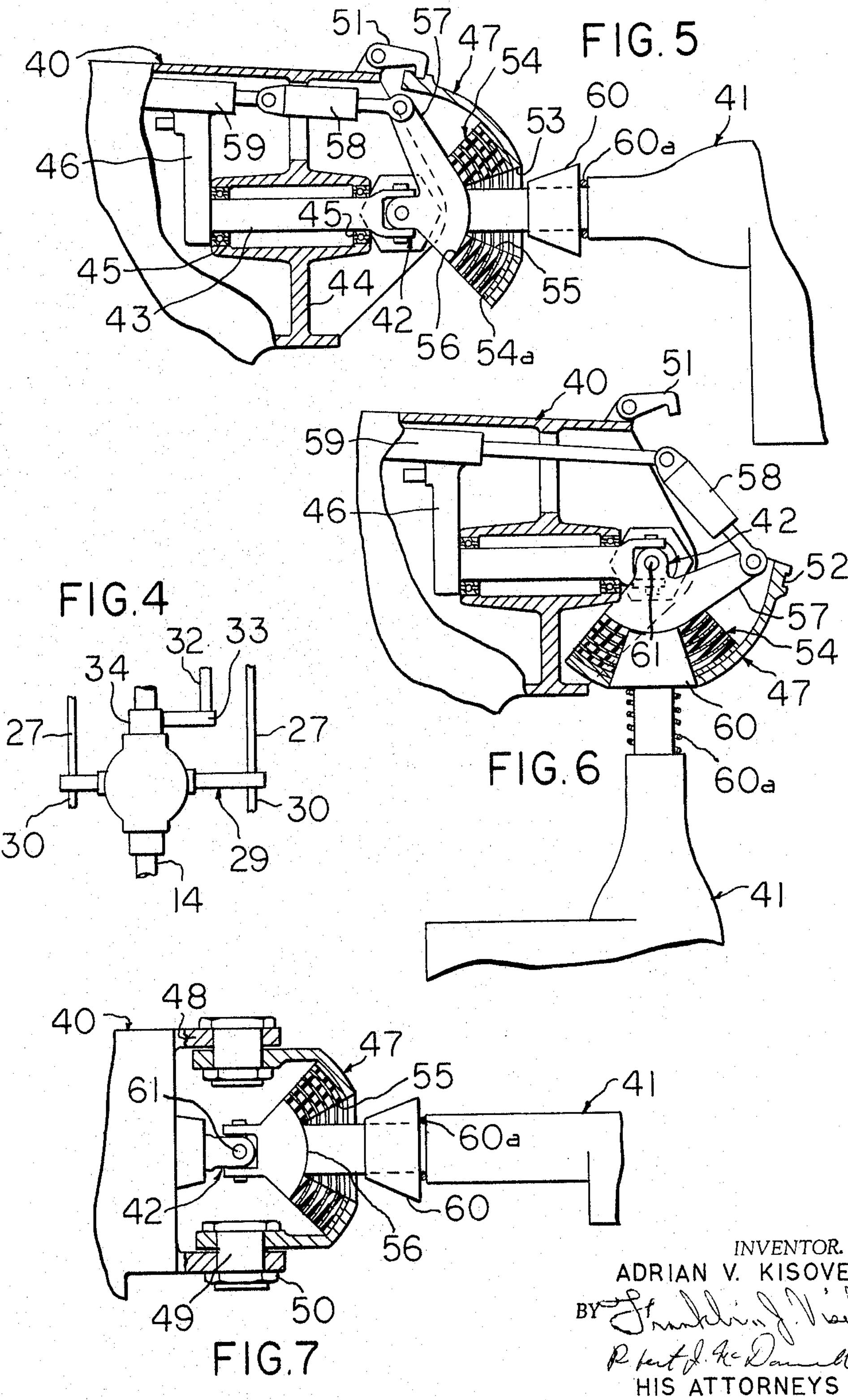
INVENTOR.
ADRIAN V. KISOVEC
BY Franklin J. Visk
Robert J. McDonnell
HIS ATTORNEYS United States Patent Office 3,282,350
Patented Nov. 1, 1966

1

3,282,350
ROTOR BLADE MOUNTING CONSTRUCTION

Adrian V. Kisovec, Morton, Pa., assignor to The Boeing Company, Seattle, Wash., a corporation of Delaware Filed Oct. 20, 1965, Ser. No. 498,477
18 Claims. (Cl. 170—160.12)

This invention relates to a rotary wing aircraft and, more particularly, to a mounting construction for rotor blades of a rotary wing aircraft.

In order to reduce the weight of the rotor, rotor blades may be mounted on a hub by elastomer bearings. Since the use of an elastomer bearing eliminates the requirement for the lead-lag hinge, the flapping hinge, and tension-torsion straps, the weight of the rotor is reduced.

However, prior rotor blade constructions using elastomer bearings have not been capable of permitting folding of the rotor blades with respect to the hub. There are various instances when it is desirable to fold the rotor blades over the fuselage of the rotary wing aircraft to reduce the amount of storage and handling area required by the rotary wing aircraft during stowing and parking maneuvers. Additionally, folding of the rotor blades is desirable from a safety standpoint since the rotary wing aircraft is less susceptible to damage by wind, particularly gusts, when it is parked.

Since deflection of an elastomer bearing is limited, normal blade folding angles through the elastomer bearing cannot be accomplished without impairing the bearing life. Of course, the rotor blade could have a separate fold pin with its accompanying structure to permit folding outboard of the elastomer bearing. However, this adds weight to the rotor whereby the weight reducing feature of the elastomer bearing is at least partially negated. This type of separate fold pin also creates undesired aerodynamic problems.

The present invention satisfactorily overcomes the foregoing problems by using a construction to fold the rotor blade without any strain or deflection of the elastomer bearing. The present invention does not utilize any additional fold pin along the blade and its accompanying structure so that the weight reducing feature of the elastomer bearing is still obtained when employed in a rotor having foldable rotor blades.

Since the amount of deflection to which elastomer bearings can normally be subjected without being damaged is limited, the elastomer bearings of prior rotor blade constructions have limited the amount of pitch that may be imparted to the rotor blades. That is, when a rotor blade, which uses an elastomer bearing, is subjected to a large pivotal movement about its pitch axis due to both collective and cyclic pitch being applied, the elastomer bearing would fail under fatigue loads or be damaged, which would reduce its life. Thus, the amount of pitch applied to blades of the prior elastomer bearing rotor constructions was limited. Of course, this limited the performance characteristics of the rotary wing aircraft.

The present invention satisfactorily overcomes the problem of undue bearing strain because of large pitch angles by allowing deflection of the elastomer bearing to occur only when cyclic pitch changes are applied to the rotor blade while preventing deflection of the elastomer bearing during collective pitch changes.

An object of this invention is to provide a foldable rotor blade construction having elastomer bearings for mounting the rotor blades.

Another object of this invention is to provide a rotor blade construction having an elastomer bearing construction in which the rotor blades are capable of being moved to high pitch angles without deflecting the elastomer bearing beyond a predetermined amount.

2

A further object of this invention is to provide a pair of spaced arcuate or spherical elastomer bearings for a rotor blade in which only the inboard arcuate bearing carries the centrifugal force load of the rotor blade.

Still another object of this invention is to provide a rotor blade construction using elastomer bearings in conjunction with positive stop means to maintain the blade in position during static conditions.

Other objects of this invention will be readily perceived from the following description, claims, and drawings.

This invention relates to a rotor including a hub adapted to be rotated, a blade, and means connecting the blade to the hub for rotation with the hub. The rotor has elastomer bearing means to permit movement of the blade in lead-lag and flapping planes with respect to the hub. The rotor also has means to permit folding of the blade from its unfolded position to a folded position without deflecting the elastomer bearing means.

This invention also relates to a rotor including a hub adapted to be rotated and a plurality of blades mounted on the hub for rotation with the hub. Elastomer bearing means is disposed between the hub and each of the blades to allow movement of each of the blades with respect to the hub in lead-lag and flapping planes during rotation of the hub. Means are attached to each of the blades to collectively change the pitch of the blades. Means rotate each of the elastomer bearing means about the pitch axis of the adjacent of the blades when the collective pitch of the blade is changed to prevent deflection of the elastomer bearing means.

The attached drawings illustrate preferred embodiments of the invention, in which—

FIGURE 1 is a top plan view of a portion of a rotor incorporating one form of the rotor blade mounting construction of the present invention;

FIGURE 2 is a sectional view, partly in plan, of a portion of the rotor blade mounting construction of FIGURE 1;

FIGURE 3 is a sectional view, partly in elevation, of the structure of FIGURE 2;

FIGURE 4 is a schematic elevational view of a portion of the pitch control structure for the rotor blade of the present invention;

FIGURE 5 is a sectional view, partly in plan, of another modification of the rotor blade mounting construction of the present invention with the rotor blade in its unfolded position;

FIGURE 6 is a view, similar to FIGURE 5, but showing the rotor blade in its folded position; and FIGURE 7 is a sectional view, partly in elevation, of the structure of FIGURE 5.

Referring to the drawings and particularly FIGURES 1–4, there is shown a hub 10, which is formed of two connected parts 11 and 12. The hub 10 is connected to a drive shaft 14 (see FIGURE 4) for rotation thereby. The shaft 14 is driven by an engineer or the like (not shown) in the well-known manner.

A plurality of blades 15 is attached to the hub 10 for rotation therewith. Each of the blades 15 is connected to the hub 10 through a pin 16, which has reduced ends journaled in openings within the parts 11 and 12 of the hub 10. A key 17, which is removable, locks the pin 16 to the hub 10 to prevent pivotal movement of the pin 16 with respect to the hub 10.

The pin 16 has an arcuate, which is preferably spherical, portion 18 between the two parts 11 and 12 of the hub 10. The blade 15 has an inboard arcuate, which is preferably spherical, portion 19 and an arcuate, which is preferably spherical, portion 20 surrounding the arcuate portion 18 of the pin 16. The arcuate portion 20, which is opposite the inboard portion 19, is secured to the inboard portion 19 by tension bolts 21.

An elastomer bearing 22 is disposed between a portion of the exterior surface of the arcuate portion 18 of the pin 16 and a portion of the inner surface of the arcuate portion 20 of the blade 15. An elastomer bearing 23 is disposed between a portion of the inner surface of the inboard arcuate portion 19 of the blade 15 and a portion of the exterior surface of the arcuate portion 18 of the pin 16.

Each of the elastomer bearings 22 and 23 is formed of a plurality of resilient elements 24 such as rubber or the like with plates 25 of metal or other non-extensible material disposed therebetween and bonded thereto. Each of the elastomer bearings 22 and 23 has a metal plate **25*a* of greater thickness than the plates 25 with the plate 25*a* adjacent the arcuate portion 18 of the pin 16. Each of the elastomer bearings 22 and 23 is formed with the same arcuate shape as the outer surface of the portion 18 of the pin 16 and the inner surface of the portions 19 and 20 of the blade 15. The center of the radius of curvature of the arcuate portion 18 of the pin 16, the elements 24 and the plates 25 and 25*a* of each of the elastomer bearings 22 and 23, and the inner surfaces of the portions 19 and 20 of the blade 15** is the same.

As shown in FIGURES 1 and 2, the elastomer bearings 22 and 23 do not engage or contact each other but are always spaced from each other. With this arrangement, all of the centrifugal forces, which are created by the blade 15, are absorbed by the elastomer bearing 22.

The elastomer bearing 23 cooperates with the elastomer bearing 22 to insure that the blade 15 remains in position during its static condition. That is, the cooperation of the elastomer bearings 22 and 23 along with engagement of a droop stop **11*a* on the part 11 of the hub 10 and the arcuate portion 20 of the blade 15 prevent any droop of the blade 15** due to its weight when it is stationary.

The elastomer bearings 22 and 23 permit the blade 15 to move in both the flapping and lead-lag planes. Movements in the flapping plane are limited by engagement of the blade 15 with a flap stop **12*a* on the part 12 of the hub 10 and the droop stop 11*a*. Movements in the lead-lag plane are dampened by a damper 26, which is attached to the arcuate portion 20 of the blade 15 by suitable means such as a spherical bearing in rod end arrangement, for example. The other end of the damper 26** is secured to a portion of the rotor.

The blade 15 has its pitch controlled by a pitch link 27, which has one end pivotally connected to a pitch arm 28 on the blade 15. The other end of the pitch link 27 is connected to a swashplate 29 (see FIGURE 4), which has rotative and non-rotative portions in the well-known manner. The swashplate 29 rotates with the drive shaft 14 but is tiltable with respect thereto and movable longitudinally with respect thereto. The position of the swashplate 29 is determined by control rods 30, which are connected to the pilot's control stick in the well-known manner.

When it is desired to change the pitch of the blades 15 collectively, the swashplate 29 is moved longitudinally with respect to the shaft 14 by the control rods 30. When it is desired to cyclically change the pitch of the blades 15, the swashplate 29 is tilted by the control rods 30 to provide the desired cyclic pitch.

When the blades 15 have both collective and cyclic pitch changes applied thereto, the deflection of the elastomer bearings 22 and 23 may be sufficient to damage the bearings due to repetitive large angular deflections. Accordingly, a mechanism is provided to rotate the entire bearing rather than deflect it when collective pitch is applied.

Each of the bearings 22 and 23 is keyed to the arcuate portion 18 of the pin 16 by any suitable means such as a stud or pin 31 (see FIGURE 2) on the plate **25*a* being disposed within a passage in the arcuate portion 18 of the pin 16 to permit rotation of the entire bearing relative to the pin 16 about the axis of the stud 31, which is coaxial with the pitch axis of the blade 15. A dry lube surface is provided between the surface of the arcuate portion 18 of the pin 16 and the plate 25*a* of each of the bearings 22 and 23 to reduce the friction during rotation of the entire bearing relative to the pin 16**.

The plates **25*a* of the bearings 22 and 23 are secured to one end of a rod or link 32 disposed therebetween. The other end of the rod 32 is attached to an arm 33, which is integral with a sleeve 34. The sleeve 34 moves longitudinally with respect to the shaft 14 whenever the swashplate 29 is moved longitudinally with respect to the shaft 14**.

According, whenever the swashplate 29 is moved longitudinally to increase or decrease the collective pitch of the blades 15, the plates **25*a* are rotated. Thus, the entire elastomer bearing rotates about the axis of the pin 31 whenever the blades 15 are rotated to change their collective pitch. When cyclic pitch is introduced into the blades 15 by tilting the swashplate 29, deflection of the elastomer bearings 22 and 23 occurs because there is no movement of the plates 25*a* by the rod 32 since the sleeve 34** does not move during cyclic pitch changes.

With this pitch adjustment arrangement of the bearings, the elastomer bearings 22 and 23 are deflected only when cyclic pitch changes are introduced to the blades 15. Whenever collective pitch changes are introduced, there is no deflection or twisting of the elastomer bearings 22 and 23 since they rotate about the studs or pins 31, which are disposed coaxial with the pitch axis of the blade 15, at the same time that the blade 15 is being moved about the pitch axis.

Considering the operation of the modification of FIGURES 1–4, each of the blades 15 rotates with the hub 10. The elastomer bearing 22 absorbs all of the centrifugal forces created by the blade 15 during rotation thereof.

The elastomer bearings 22 and 23 cooperate to permit movement of the blade 15 in the lead-lag and flapping planes during rotation. The elastomer bearings 22 and 23 deflect or twist to permit the blade 15 to be rotated about its pivot axis when cyclic changes are imparted thereto. When collective pitch is applied, the bearings 22 and 23 rotate about the axes of the studs 31, which are coaxial with the pitch axis of the blade 15, to prevent deflection thereof.

When it is desired to fold the blade 15, the key 17 must be removed. This allows the blade 15 to be rotated with respect to the hub 10 about the axis of the pin 16. When the blade 15 reaches its folded position, it is held in the locked position by suitable means such as disposing the key 17 in a key slot 35, for example.

It should be understood that the damper 26, the pitch link 27, and the control rod 32 must be disconnected from the blade 15 to permit folding thereof. This preferably occurs before the key 17 is removed from its locking position. It also should be understood that the blade 15 is locked against movement about its pitch axis during and after folding due to the spring rate of the elastomer bearings 22 and 23.

If desired, the elastomer bearing 23 could be omitted. In this arrangement, the arcuate portion 19 of the blade 15 would contact the arcuate portion 18 of the pin 16 when the blade 15 was not rotating. However, as soon as the blade 15 begins to rotate, centrifugal force would move the arcuate portion 19 away from the arcuate portion 18 of the pin 16 due to the elastomer bearing 22 compressing.

The spring rate of the elastomer bearing 22 would be sufficient to prevent large pitch change of the blade 15 during and after folding. In a static condition, the elastomer bearing 22 would be unloaded because the droop moment is resolved through forces at the dry lube surface, which is between the inner portion 19 of the blade 15 and the arcuate portion 18 of the pin 16, and the droop stop **11*a***.

Referring to FIGURES 5–7, there is shown another form of the present invention wherein a hub 40 is adapted to be rotated by the drive shaft 14 in the same manner as the hub 10. A plurality of blades (one shown at 41) is connected to the hub 40 for rotation therewith.

The inner end of the blade 41 is connected by a universal joint 42 to a pitch shaft 43. The pitch shaft 43 is rotatably mounted within a support 44 of the hub 40 by bearings 45. When the shaft 43 is rotated about its axis, which is coaxial with the pitch axis of the blade 41, the pitch of the blade 41 is changed.

The pitch shaft 43 is connected to a pitch arm 46. The pitch arm 46 is connected to one of the pitch links 27 in the same manner as the pitch arm 28 of the embodiment of FIGURES 1–4 to cause movement of the blade 41 about its pitch axis.

A bearing housing 47 is pivotally connected to upper and lower flanges 48 of the hub 40 by bolts 49 and nuts 50. The bearing housing 47 is locked to the hub 40 by a latch 51, which is pivotally mounted on the hub 40. The latch 51 fits within a groove 52 in the exterior surface of the bearing housing 47.

The bearing housing 47 has an opening 53 through which the inboard end of the blade 41 extends. An elastomer bearing 54, which is preferably formed in the same manner as the bearings 22 and 23, is disposed within the bearing housing 47 and supported thereby. The bearing 54 has a conical shaped passage 55 communicating with the opening 53 whereby the inboard end of the blade 41 may extend therethrough. The inner surface of the elastomer bearing 54 bears against the exterior surface of an arcuate portion 56, which is formed on the inboard end of the blade 41.

The elastomer bearing 54 absorbs the centrifugal forces created by the blade 41 during its rotation with the hub 40. The conical shaped passage 55 in the bearing 54 permits the blade 41 to move in both the lead-lag and flapping planes. However, the amount of movement is limited by the angle of the conical passage 55 with respect to the pitch axis of the blade 41.

The arcuate portion 56 of the blade 41 has an arm 57 extending therefrom with its end pivotally connected to one end of a lead-lag damper 58 by suitable means such as a spherical bearing in rod end arrangement, for example. The other end of the lead-lag damper 58 is connected to the pitch arm 46 through a hydraulic actuator 59, which is fixedly connected to the pitch arm 46 and pivotally connected to the damper 58. Thus, the lead-lag damper 58 moves whenever the pitch of the blade 41 is changed.

The elastomer bearing 54 has a plate 54*a*, which is thicker than the other metal plates in the same manner as the plate 25*a*, disposed in contact with the inner surface of the bearing housing 47. A dry lube surface is provided between the plate 54*a* and the inner surface of the bearing housing 47.

The elastomer bearing 54 has at least the plate 54*a* keyed to the housing 47 so that it maintains a desired position with respect thereto when the elastomer bearing 54 is rotated whenever collective pitch is applied to the blades (one shown at 41) in the same manner as described for the modification of FIGURES 1–4. The plate 54*a* is connected to the rod 32 in a manner similar to connection of the plates 25*a* of the elastomer bearings 22 and 23. Thus, the blades (one shown at 41) may be moved to high angles of pitch whenever collective pitch and cyclic pitch are applied thereto.

A locking cone 60 is slidably mounted on the inboard portion of the blade 41. When the cone 60 is positioned within the passage 55 in the elastomer bearing 54, movement of the blade 41 in the flapping and lead-lag planes is prevented and pitch change of the blade 41 is prevented. The locking cone 60 may automatically move outwardly by overcoming the force of spring 60*a*, for example, whenever the blade 41 is rotated. Similarly, when the blade 41 ceases to rotate, the spring 60*a* has sufficient force to move the locking cone 60 into position within the passage 55 to lock the blade 41 against flapping and lead-lag movements and against pitch change.

When it is desired to fold the blade 41, the locking cone 60 is moved into the passage 55 to lock the blade 41 against flapping and lead-lag movements and pitch change. Prior to moving the locking cone 60 into the passage 55, the blade 41 is pivoted about its pitch axis through movement of the pitch arm 46 until an axis 61 of the universal joint 42 is aligned with the pivot axis of the bearing housing 47 (see FIGURE 7).

It should be understood that the pitch arm 46 and the pitch shaft 43 are locked against movement after the axis 61 of the universal joint 42 is aligned with the pivot axis of the bearing housing 47. This locking movement may be accomplished at the pilot's control stick, for example. Prior to folding, the rod 32 is disconnected from the elastomer bearing 54.

If desired, the cone 61 could have a pyramid shape with the passage 55 being of corresponding shape. This would result in the blade 41 being automatically pivoted to align the axis 61 of the universal joint 42 with the pivot axis of the bearing housing 47 when the blade 41 stopped rotating. With the cone 61 so shaped, the pitch shaft 43 and the pitch arm 46 would not be capable of changing the pitch of the blade 41 so that locking means such as at the pilot's control stick would not be necessary.

With the axis 61 of the universal joint 42 aligned with the pivot axis of the bearing housing 47 and the locking cone 60 disposed within the passage 55 in the elastomer bearing 54, the blade 41 is ready to be folded. At this time, the latch 51 is pivoted to be removed from the groove 52 in the bearing housing whereby the bearing housing 47 is unlocked from the hub 40. This permits the blade 41 to be rotated about the axis of the bearing housing 47 and the axis 61 of the universal joint 42.

The hydraulic actuator 59, which is fixedly secured to the pitch arm 46 and pivotally connected to the lead-lag damper 58, is employed to drive the blade 41 from its unfolded position to a folded position and vice versa. The blade 41 is held in its folded position by the force applied through the actuator 59. If desired, suitable hydraulic lines could be connected to the damper 58 for moving the blade 41 and the actuator 59 eliminated.

When it is desired to return the blade 41 to its unfolded position, the actuator 59 is used to return the blade 41 to its unfolded position. When the blade 41 returns to its unfolded position, the latch 51 again is disposed within the groove 52 in the bearing housing 47 to lock the bearing housing 47 to the hub 40. When the blade 41 is rotated, the locking cone 60 moves out of the passage 55 in the bearing 54 in response to centrifugal force and the blade 41 is again operational. Of course, the rod 32 is again connected to the elastomer bearing 54.

Through the use of the bearing housing 47, the blade 41 is folded without any deflection or strain of the elastomer bearing 54. Furthermore, high angles of pitch may be imparted to the blade 41 without damaging the elastomer bearing 54 because of the cooperation of the plate 54*a* of the bearing 54 with the sleeve 34 through the rod 32 in the manner previously described for the modification of FIGURES 1–4.

It should be understood that either of the embodiments of this invention may be used without the adjustment of the elastomer bearing when collective pitch is applied to the blade. Likewise, the adjustment of the elastomer bearing when collective pitch is applied to the blade may be utilized with a non-foldable rotor blade in the same manner as it is shown utilized with a foldable rotor blade. While the present invention has been described with respect to a single rotor hub, it should be understood that the present invention may be utilized on blades of each of a plurality of rotor hubs on a rotary wing aircraft such as in a coaxial or tandem arrangement, for example.

An advantage of this invention is that folding of a rotor blade is accomplished with a minimum number of parts. Another advantage of this invention is that folding of a rotor blade having an elastomer bearing is performed without deflection of the elastomer bearing whereby any damage to the bearing is eliminated. A further advantage of this invention is that it eliminates the requirement of any special fold hinge and its accompanying structure to fold a rotor blade. Still another advantage of this invention it its low cost because of the small number of parts and the simplicity of the parts. A still further advantage of this invention is that the weight of a rotor having a foldable rotor blade is reduced.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A rotor including a hub adapted to be rotated, a blade, means connecting said blade to said hub for rotation with said hub, elastomer bearing means to permit movement of said blade in lead-lag and flapping planes with respect to said hub, and means to permit said blade and said elastomer bearing means to be pivoted together to a folded position about an axis adjoining said elastomer bearing means.

2. A rotor including a hub adapted to be rotated, an arcuate shaped elastomer bearing, means pivotally mounting said elastomer bearing on said hub, said arcuate shaped elastomer bearing having a passage extending therethrough, a blade having its inboard end extending through said passage, said arcuate shaped elastomer bearing its concave surface facing towards the inboard end of said blade, said blade having an arcuate surface adjacent its inboard end for cooperating with the concave surface of said arcuate shaped elastomer bearing, means to control the pitch of said blade, a universal joint connecting said pitch control means and the inboard end of said blade, said universal joint having one of its pivot axes adapted to be aligned with the pivot axis of said elastomer bearing to permit said blade and said elastomer bearing to be pivoted together about a single axis to a folded position of said blade, and means to prevent pivotal movement of said elastomer bearing with respect to said hub to retain said blade in its unfolded position.

3. A rotor including a hub adapted to be rotated, an arcuate shaped elastomer bearing, means pivotally mounting said elastomer bearing on said hub, said arcuate shaped elastomer bearing having a passage extending therethrough, a blade having its inboard end extending through said passage, said arcuate shaped elastomer bearing having its concave surface facing towards the inboard end of said blade, said blade having an arcuate surface adjacent its inboard end for cooperating with the concave surface of said arcuate shaped elastomer bearing, means to control the pitch of said blade, a universal joint connecting said pitch control means and the inboard end of said blade, said universal joint having one of its pivot axes adapted to be aligned with the pivot axis of said elastomer bearing to permit said blade and said elastomer bearing to be pivoted together about a single axis to a folded position of said blade, means to prevent pivotal movement of said elastomer bearing with respect to said hub to retain said blade in its unfolded position, and means to lock said blade against movement with respect to said elastomer bearing during folding of said blade.

4. A rotor including a hub adapted to be rotated, an elastomer bearing, means pivotally mounting said elastomer bearing on said hub, a blade connected to said hub, said hub having its inboard end formed with a surface for cooperating with a surface of said elastomer bearing whereby centrifugal forces of said plate are absorbed by said elastomer bearing, means to pivot said blade and said elastomer bearing together about the pivot axis of said elastomer bearing to a folded position of said blade, and means to prevent pivotal movement of said elastomer bearing with respect to said hub to retain said blade in its unfolded position.

5. A rotor including a hub adapted to be rotated, an arcuate shaped elastomer bearing, means pivotally mounting said elastomer bearing on said hub, a blade connected to said hub, said hub having its inboard end formed with an arcuate surface for cooperating with an arcuate surface of said arcuate shaped elastomer bearing whereby centrifugal forces of said plate are absorbed by said elastomer bearing, means to pivot said blade and said elastomer bearing together about the pivot axis of said elastomer bearing to a folded position of said blade, and means to prevent pivotal movement of said elastomer bearing with respect to said hub to retain said blade in its unfolded position.

6. A rotor including a hub adapted to be rotated, a bearing housing pivotally mounted on said hub, an elastomer bearing mounted in said bearing housing, said bearing having an opening therein, said elastomer bearing having a passage extending therethrough and aligned with said opening, a blade having its inboard end extending through said opening and said passage, said blade having a surface adjacent its inboard end for cooperating with said elastomer to permit movement of said blade in lead-lag and flapping planes, means to control the pitch of said blade, a universal joint connecting said pitch control means and the inboard end of said blade, said universal joint having one of its pivot axes adapted to be aligned with the pivot axis of said bearing housing to permit said blade and said bearing housing to be pivoted together about a single axis to a folded position of said blade, and means to lock said bearing housing to said hub to retain said blade in its unfolded position.

7. A rotor including a hub adapted to be rotated, a bearing housing pivotally mounted on said hub, and elastomer bearing mounted in said bearing housing, said bearing housing having an opening therein, said elastomer bearing having a passage extending therethrough and aligned with said opening, a blade having its inboard end extending through said opening and said passage, said blade having a surface adjacent its inboard end for cooperating with said elastomer bearing to permit movement of said blade in lead-lag and flapping planes, means to control the pitch of said blade, a universal joint connecting said pitch control means and the inboard end of said blade, said universal joint having one of its pivot axes adapted to be aligned with the pivot axis of said bearing housing to permit said blade and said bearing housing to be pivoted together about a single axis to a folding position of said blade, means to lock said bearing housing to said hub to retain said blade in its unfolded position, and means to lock said blade against movement with respect to said elastomer bearing during folding of said blade.

8. A rotor including a hub adapted to be rotated, a bearing housing pivotally mounted on said hub, an elastomer bearing mounted in said bearing housing, said bearing housing having an opening therein, said elastomer bearing having a passage extending therethrough and aligned with said opening, a blade having its inboard end extending through said opening and said passage, said blade having a surface adjacent its inboard end for cooperating with said elastomer bearing to permit movement of said blade in lead-lag and flapping planes, means to control the pitch of said blade, a universal joint connecting said pitch control means and the inboard end of said blade, said universal joint having one of its pivot axes adapted to be aligned with the pivot axis of said bearing housing to permit said blade and said bearing housing to be pivoted together about a single axis to a folded position of said blade, means to lock said bearing housing to said hub to retain said blade in its unfolded position, and means to lock said blade to said bearing housing to prevent movement of said blade with respect to said bearing housing during folding of said blade.

9. A rotor including a hub adapted to be rotated, a bearing housing pivotally mounted on said hub, an arcuate shaped elastomer bearing mounted in said bearing housing, said bearing housing having an opening therein, said arcuate shaped elastomer bearing having a passage extending therethrough and aligned with said opening, a blade having its inboard end extending through said opening and said passage, said arcuate shaped elastomer bearing having its concave surface facing towards the inboard end of said blade, said blade having an arcuate surface adjacent its inboard end for cooperating with the concave surface of said arcuate shaped elastomer bearing to permit movement of said blade in lead-lag and flapping planes, means to control the pitch of said blade, a universal joint connecting said pitch control means and the inboard end of said blade, said universal joint having one of its pivot axes adapted to be aligned with the pivot axis of said bearing housing to permit said blade and said bearing housing to be pivoted together about a single axis to a folded position of said blade, and means to lock said bearing housing to said hub to retain said blade in its unfolded position.

10. A rotor including a hub adapted to be rotated, a bearing housing pivotally mounted on said hub, an arcuate shaped elastomer bearing mounted in said bearing housing, said bearing housing having an opening therein, said arcuate shaped elastomer bearing having a passage extending therethrough and aligned with said opening, a blade having its inboard end extending through said opening and said passage, said arcuate shaped elastomer bearing having its concave surface facing towards the inboard end of said blade, said blade having an arcuate surface adjacent its inboard end for cooperating with the concave surface of said arcuate shaped elastomer bearing to permit movement of said blade in lead-lag and flapping planes, means to control the pitch of said blade, a universal joint connecting said pitch control means and the inboard end of said blade, said universal joint having one of its pivot axes adapted to be aligned with the pivot axis of said bearing housing to permit said blade and said bearing housing to be pivoted together about a single axis to a folded position of said blade, means to lock said bearing housing to said hub to retain said blade in its unfolded position, and means to lock said blade against movement with respect to said elastomer bearing during folding of said blade.

11. A rotor including a hub adapted to be rotated, a pin pivotally mounted on said hub, means to lock said pin to prevent movement with respect to said hub, said pin having an arcuate portion, a blade mounted on said pin for rotation with said hub and having portions surrounding said arcuate portion of said pin, and at least one arcuate shaped elastomer bearing disposed between said arcuate portion of said pin and one of said surrounding portions of said blade to permit movement of said blade in lead-lag and flapping planes.

12. A rotor including a hub adapted to be rotated, a pin pivotally mounted on said hub, means to lock said pin to prevent movement with respect to said hub, said pin having an arcuate portion, a blade mounted on said pin for rotation with said hub and having portions surrounding said arcuate portion of said pin, and a pair of arcuate shaped elastomer bearings disposed between said arcuate portion of said pin and said surrounding portions of said blade to permit movement of said blade in lead-lag and flapping planes.

13. A rotor including a hub adapted to be rotated, a pin pivotally mounted on said hub, means to lock said pin to prevent movement with respect to said hub, said pin having an arcuate portion, a blade mounted on said pin for rotation with said hub and having portions surrounding said arcuate portion of said pin, a pair of arcuate shaped elastomer bearings disposed between said arcuate portion of said pin and said surrounding portions of said blade to permit movement of said blade in lead-lag and flapping planes, and said arcuate shaped elastomer bearings always being spaced from contact with each other.

14. A rotor including a hub adapted to be rotated, said hub having portions spaced from each other, a pin pivotally mounted in each of said spaced portions of said hub and extending between said spaced portions, said pin having an arcuate portion between said spaced portions of said hub, a blade mounted on said arcuate portion of said pin for rotation with said hub, said blade having a first arcuate shaped portion at its inboard end and a second arcuate shaped portion spaced outwardly from its inboard end and opposite therefrom, an arcuate shaped elastomer bearing disposed between said arcuate portion of said pin and said first arcuate shaped portion of said blade, and means to lock said pin to said hub to prevent pivotal movement of said blade with respect to said hub.

15. A rotor including a hub adapted to be rotated, said hub having portions spaced from each other, a pin pivotally mounted in each of said spaced portions of said hub and extending between said spaced portions, said pin having an arcuate portion between said spaced portions of said hub, a blade mounted on said arcuate portion of said pin for rotation with said hub, said blade having a first arcuate shaped portion at its inboard end and a second arcuate shaped portion spaced outwardly from its inboard end and opposite therefrom, a first arcuate shaped elastomer bearing disposed between said arcuate portion of said pin and said first arcuate shaped portion of said blade, a second arcuate shaped elastomer bearing disposed between said arcuate portion of said pin and said second arcuate shaped portion of said blade, and means to lock said pin to said hub to prevent pivotal movement of said blade with respect to said hub.

16. A rotor including a hub adapted to be rotated, said hub having portions spaced from each other, a pin pivotally mounted in each of said spaced portions of said hub and extending between said spaced portions, said pin having an arcuate portion between said spaced portions of said hub, a blade mounted on said arcuate portion of said pin for rotation with said hub, said blade having a first arcuate shaped portion at its inboard end and a second arcuate shaped portion spaced outwardly from its inboard end and opposite therefrom, a first arcuate shaped elastomer bearing disposed between said arcuate portion of said pin and said first arcuate shaped portion of said blade, a second arcuate shaped elastomer bearing disposed between said arcuate portion of said pin and said second arcuate shaped portion of said blade, means to lock said pin to said hub to prevent pivotal movement of said blade with respect to said hub, and said arcuate shaped elastomer bearings always being spaced from contact with each other.

17. A rotor including a hub adapted to be rotated, a plurality of blades mounted on said hub for rotation with said hub, elastomer bearing means disposed between said hub and each of said blades to allow movement of each of said blades with respect to said hub in lead-lag and flapping planes during rotation of said hub, means attached to each of said blades to collectively change the pitch of said blades, and means to rotate each of said elastomer bearing means about the pitch axis of the adjacent of said blades when the collective pitch of said blades is changed to prevent deflection of said elastomer bearing means.

18. A rotor including a hub adapted to be rotated, a plurality of blades mounted on said hub for rotation with said hub, elastomer bearing means disposed between said hub and each of said blades to allow movement of each of said blades with respect to said hub in lead-lag and flapping planes during rotation of said hub, means attached to each of said blades to collectively change the pitch of said blades, and means connected to each of said elastomer bearing means at the end remote to the bearing contact surface between said blade and said elastomer bearing means to move said elastomer bearing means when the collective pitch of said blades is changed to prevent deflection of said elastomer bearing means.

References Cited by the Examiner

UNITED STATES PATENTS 3,106,965 10/1963 Gorndt et al. ----- 170—160.53

FOREIGN PATENTS 572,081 9/1945 Great Britain.

MARTIN P. SCHWADRON, *Primary Examiner*.

E. A. POWELL, *Assistant Examiner*.

UNITED STATES PATENT OFFICE

CERTIFICATE OF CORRECTION

Patent No. 3,282,350 November 1, 1966

Adrian V. Kisovec

It is hereby certified that error appears in the above numbered patent requiring correction and that the said Letters Patent should read as corrected below.

Column 2, line 56, for "engineer" read -- engine --; column 4, line 13, for "according" read -- accordingly --; line 18, for "when" read -- whenever --; column 7, line 36, before "it" insert -- having --; column 8, line 25, before "having an" insert -- housing --; line 30, after "elastomer" insert -- bearing --; line 41, for "and" read -- an --; line 55, for "folding" read -- folded --.

Signed and sealed this 5th day of September 1967.

(SEAL)
Attest:

ERNEST W. SWIDER
Attesting Officer

EDWARD J. BRENNER
Commissioner of Patents